(12) United States Patent
Andersson et al.

(10) Patent No.: US 6,240,125 B1
(45) Date of Patent: *May 29, 2001

(54) METHOD AND MEANS FOR FREQUENCY HOPPING IN A RADIO COMMUNICATION SYSTEM

(75) Inventors: Claes Håkan Andersson, Ekerö; Knut Magnus Almgren, Sollentuna, both of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,947
(22) PCT Filed: Jul. 13, 1995
(86) PCT No.: PCT/SE95/00855
  § 371 Date: Jan. 13, 1997
  § 102(e) Date: Jan. 13, 1997
(87) PCT Pub. No.: WO96/02980
  PCT Pub. Date: Feb. 1, 1996

(30) Foreign Application Priority Data

Jul. 15, 1995 (SE) .................................................... 9402492

(51) Int. Cl.⁷ .................................................. H04L 27/30
(52) U.S. Cl. ........................ 375/132; 325/133; 325/136; 325/137; 325/347
(58) Field of Search .............................. 455/62, 522, 452, 455/434, 673, 63, 512; 370/353, 337, 330; 375/347, 132, 136, 137, 133

(56) References Cited

U.S. PATENT DOCUMENTS

| | | | |
|---|---|---|---|
| 4,716,573 | * 12/1987 | Bergstrom et al. | 375/202 |
| 5,280,630 | * 1/1994 | Wang | 455/452 |
| 5,457,711 | * 10/1995 | Kellermann | 375/347 |
| 5,475,868 | * 12/1995 | Duque-Anton et al. | 455/62 |
| 5,581,548 | * 12/1996 | Ugland et al. | 370/353 |
| 5,666,655 | * 9/1997 | Ishikawa et al. | 455/512 |

FOREIGN PATENT DOCUMENTS 2 261 141   11/1992   (GB) .

* cited by examiner

Primary Examiner—Stephen Chin
Assistant Examiner—Shuwang Liu
(74) Attorney, Agent, or Firm—Burns, Doane, Swecker & Mathis, L.L.P.

(57) ABSTRACT

A radio communications systems which utilize channel hopping such that those channels which have high channel quality for a given connection are used more often than channels having lower channel quality for the same connection. Channel quality, for instance interference, is measured with respect to uplink connections and with respect to downlink connections. The measured interference values are then stored in an interference list for each of the connections in the radio communications system. The interference lists are converted to corresponding weight lists for each of the connections in both uplink and downlink in the base station. A channel which has a high weight value for a given connection will appear more often in corresponding hopsequence lists than a channel which has a lower weight value.

16 Claims, 12 Drawing Sheets

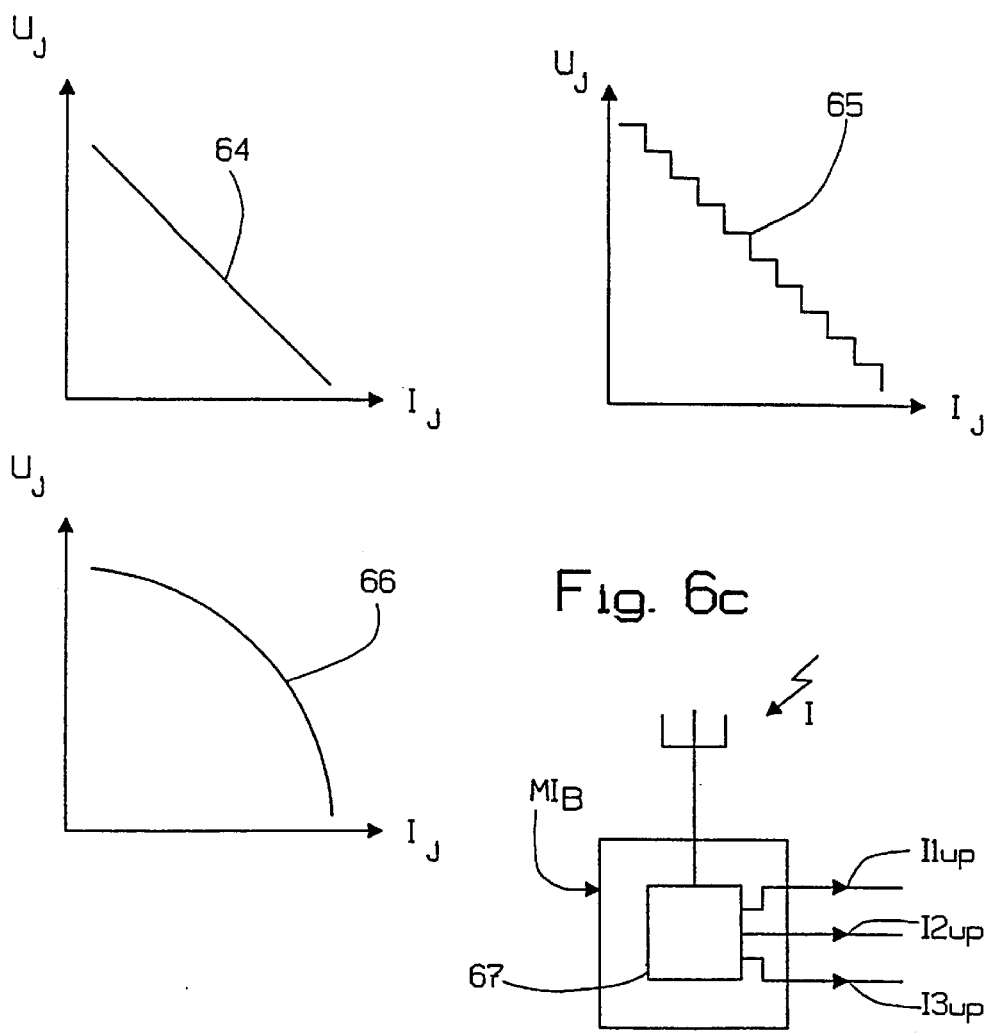
Fig. 6c
Fig. 6d
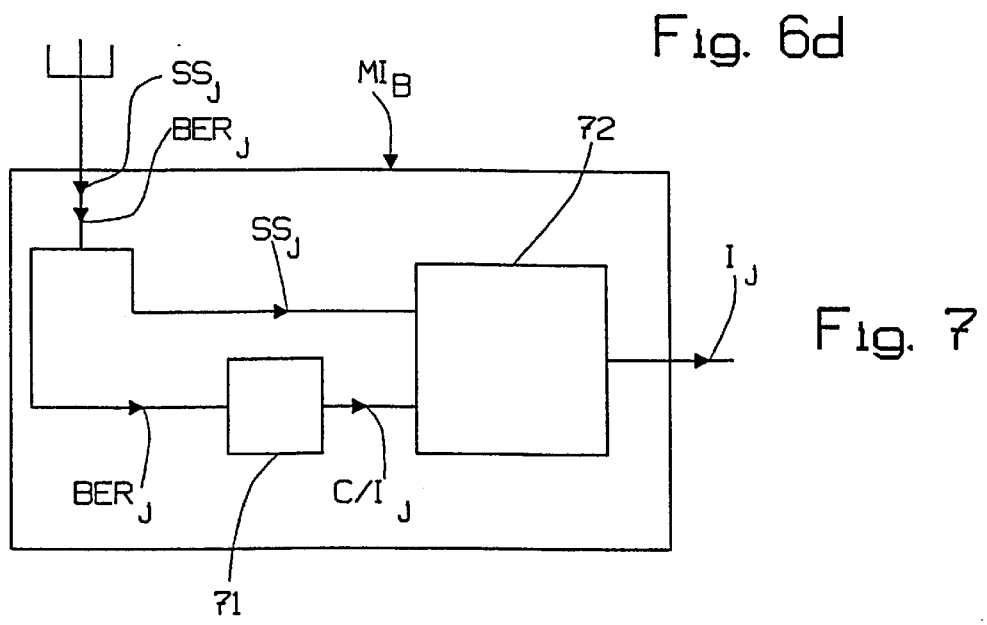
Fig. 7

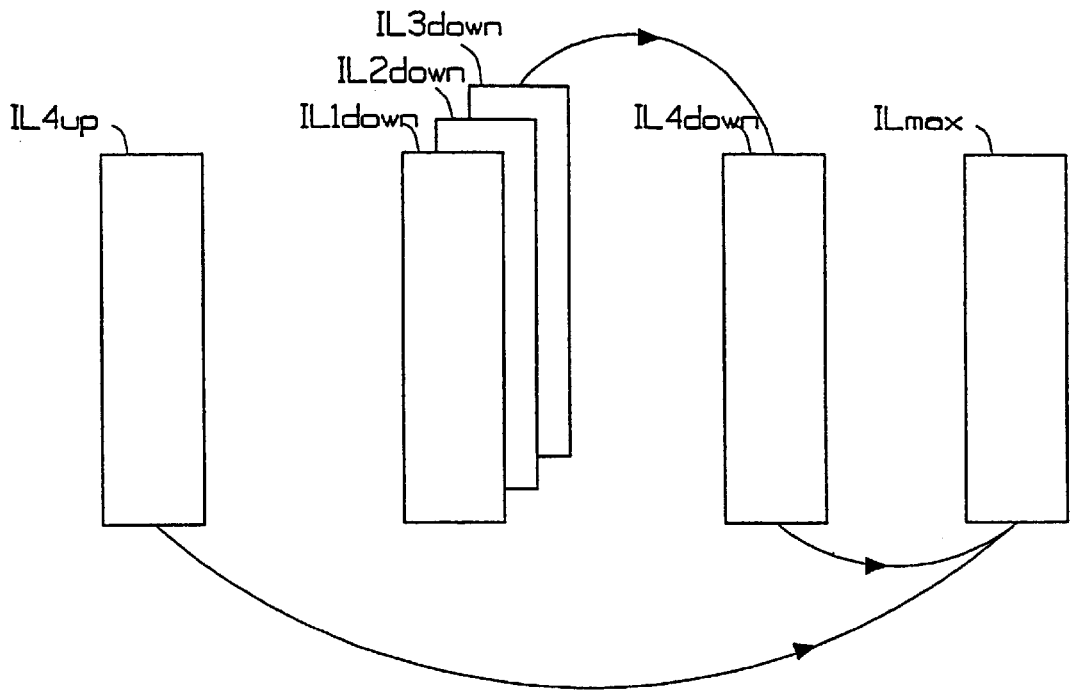
Fig. 9a
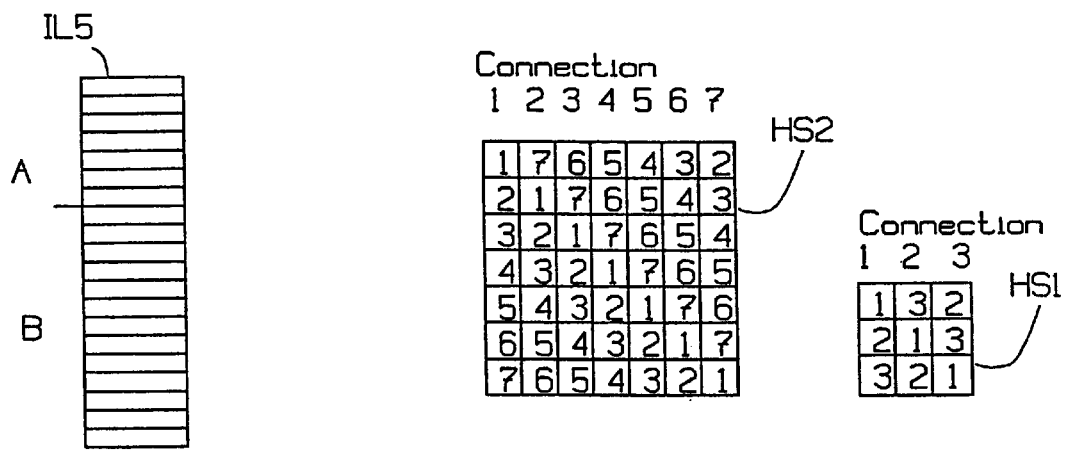
Fig. 9b
Fig. 9c
Fig. 9d

METHOD AND MEANS FOR FREQUENCY HOPPING IN A RADIO COMMUNICATION SYSTEM

TECHNICAL FIELD

The present invention relates to the field of radio communications and then particularly to frequency hopping and hop between time-divided channels in a mobile telecommunications system. The invention includes a method in which hopsequence for hops between channels are established for different connections, thereby enhancing channel utilization. Channel interference is used to construct the hopsequences. The invention also relates to an arrangement for carrying out the method.

TECHNICAL FIELD

Frequency hopping in radio communications systems is known to the art and, for instance, has been used in military contexts to escape tapping of transmissions. In this regard, communication is effected with hops between different frequencies at regular time intervals. The hopsequences are formed by pseudo-slump series that are known only to the transmitter and receiver.

In addition to hops between different frequencies, frequency hopping also refers to hops between different frequency/time slot combinations in a TDMA system. This latter should actually be named frequency/time slot combination hopping, but the collective term channel hopping is used in the following for practical convenience.

Channel hopping has also been used in radio communications systems for the purpose of reducing disturbances. The advantage afforded in this regard is that the energy in the system is distributed between the different channels. In this regard, a number of channels are allocated to one and the same connection. As communication proceeds, the system causes the connections to hop between the channels in accordance with a given hop rule, for instance through the medium of a predetermined pseudo-slump series. When using a purely frequency hopping procedure, the disturbances are spread in the system because the centre frequency at which transmission takes place is changed on a number of occasions with each second. However, the level of disturbance in a radio communications system becomes higher when this type of frequency hop is used than when using a purely frequency schedule. This is because when frequency hopping, the frequencies are not chosen in a relevant manner, but are instead chosen randomly.

U.S. Pat. No. 4,716,573 teaches a frequency hopping system in which the frequency hop is determined with the aid of random number generation. Different frequencies have different measured status values which decide whether or not a pseudo-randomly selected frequency shall be included in the hopsequence.

The German published specification DE 3415032 A1 teaches a frequency hopping system in which frequency hopping is effected pseudo-randomly. The frequencies used are monitored and excluded from further use when they no longer have an acceptable interference level.

U.S. Pat. No. 4,998,290 describes a radio communications system which utilizes frequency hopping. The system includes a central control station which allocates frequencies for communication with several participating local radio stations. The control station maintains an interference matrix which reflects the capacity requirement of the various radio stations and the interference on all connections.

U.K. Patent Application GB 2,261,141 A teaches a method which utilizes frequency hopping in a radio communications system. The method involves monitoring the channels included in the hop sequence and replacing with new channels those channels that do not fulfil a quality criterion.

A general problem related to mobile telecommunications systems is that allocation of the bidirectional connections between base stations and mobile stations is effected without adequate channel selection. Attention is paid only to a few parameters, for instance only to the C/I value when deciding whether or not the connection is satisfactory. This has caused the system to allocate a channel which has good quality properties to a connection. The connection continues to use the allocated channel over the entire communication period, without taking into account the consequences of the allocation, for instance its disturbing influence on other connections or to uneven distribution of radio resources between different base stations. This has stopped the optimization of mobile telecommunications systems, for instance with regard to radio resources and with regard to disturbance effects on other connections. Examples of radio communications systems in which the aforesaid problem occurs are mobile telecommunications systems which use frequency division (FDMA), time division (TDMA), coding (CDMA) and so-called DECT systems.

SUMMARY OF THE INVENTION

The invention is concerned with improving radio communications systems which utilize channel hopping, and solves the problem of selecting the radiochannels between which the connection hops in a relevant fashion.

An object of the present invention is to provide a radio communications system which utilizes channel hopping such that those channels which have high channel quality for a given connection are used more often than channels having lower channel quality for the same connection. Interference is a measurement of channel quality. According to the invention, other channel quality measurements may also be used, for instance the bit error rate, BER, or the quotient between useful and disturbing signal strengths, the so-called C/I value.

Another object of the invention is to optimize channel utilization in a radio communications system that uses frequency hopping.

Still a further object of the invention is to enable a radiochannel that has very high channel quality to be used for several connections in progress. Still another object is to enable a radiochannel that has very low channel quality to be used occasionally in the connections in progress.

Yet still another object of the invention is to provide orthogonality in a base station of a radio communications system. This means that two or more separate connections in one and the same base station will never use one and the same radio channels simultaneously.

Another object of the invention is to make new radio channels available to a connection in the process of communication, thereby improving connection quality, and to make other radio channels whose quality is too low unavailable.

These objects are achieved with a method in which separate radio channels are allocated separate weight values in accordance with the respective measured channel qualities of the channels. Separate hopsequences are then formed for separate connections in accordance with the weight values allotted. The weight values are used to decide which channels shall be included in the hopsequences, and how often they shall appear. The connections then hop between the channels in accordance with the respective hopsequences formed. The invention also relates to an arrangement for carrying out the method.

According to the inventive method, the interference or some other quality measurement of the channels in a radio communications system, for instance a mobile telecommunications system, is measured for separate connections between at least one first base station and a plurality of mobile stations. The connections are generally bidirectional, having an uplink from a mobile station to a base station and a downlink from the base station to the mobile station. Channel quality, for instance interference, is measured with respect to uplink connections and with respect to downlink connections. The measured interference values are then stored in an interference list for each of the connections in the radio communications system. Downlink interference is measured in respective mobile stations, while uplink interference is measured in the base station. The downlink interference values are sent to the base station, via a control channel.

The interference lists are converted to corresponding weight lists for each of the connections in both uplink and downlink in the base station. The weight lists are preferably normalized so that the sum of all weights in a weight list for one connection will equal the value 1 (one). The weight lists are then analyzed in an allocation circuit which allocates channels in a hop sequence list for each of the uplink and the downlink connections in accordance with the content of the weight lists. A channel which has a high weight value for a given connection will appear more often in corresponding hopsequence lists than a channel which has a lower weight value. The base station and the mobile stations both have access to the hopsequence lists, by virtue of said lists being copied from the base station to the respective mobile stations via a control channel. The hopsequence lists are finally used for channel hopping between channels in the hopsequence list generated for respective connections.

One advantage afforded by the invention is that a channel that has only low interference, i.e. a high-quality channel, can be used more often than a channel in which interference is high. This minimizes the propagation of disturbances in the system, while enabling the channel to be utilized more effectively. Another advantage is that the inventive channel hopping method is instrumental in spreading channels that have low and high interference respectively throughout the system in a systematic fashion. Still another advantage is that a channel which has such a high level of interference as to render the channel unusable on its own without employing channel hopping can be used in a hop sequence now and then while maintaining acceptable quality on the connection concerned. Still another advantage is that connections channels can be included and excluded successively for the duration of a connection.

The invention will now be described in more detail with reference to a preferred exemplifying embodiment thereof and also with reference to the accompanying drawings.

BRIEF DESCRIPTION OF THE DRAWINGS

FIG. 6c shows three diagrams illustrating three different conversion curves.

FIG. 6d is a block schematic illustrating the measuring receiver in FIG. 6a.

FIG. 7 is a block schematic illustrating a compensating circuit.

FIG. 9a shows different interference lists in block form.

FIG. 9b shows in block form an interference list divided into two groups.

FIGS. 9c and 9d are respective block diagrams of a hopschedule.

BEST MODES OF CARRYING OUT THE INVENTION

Figure 1:
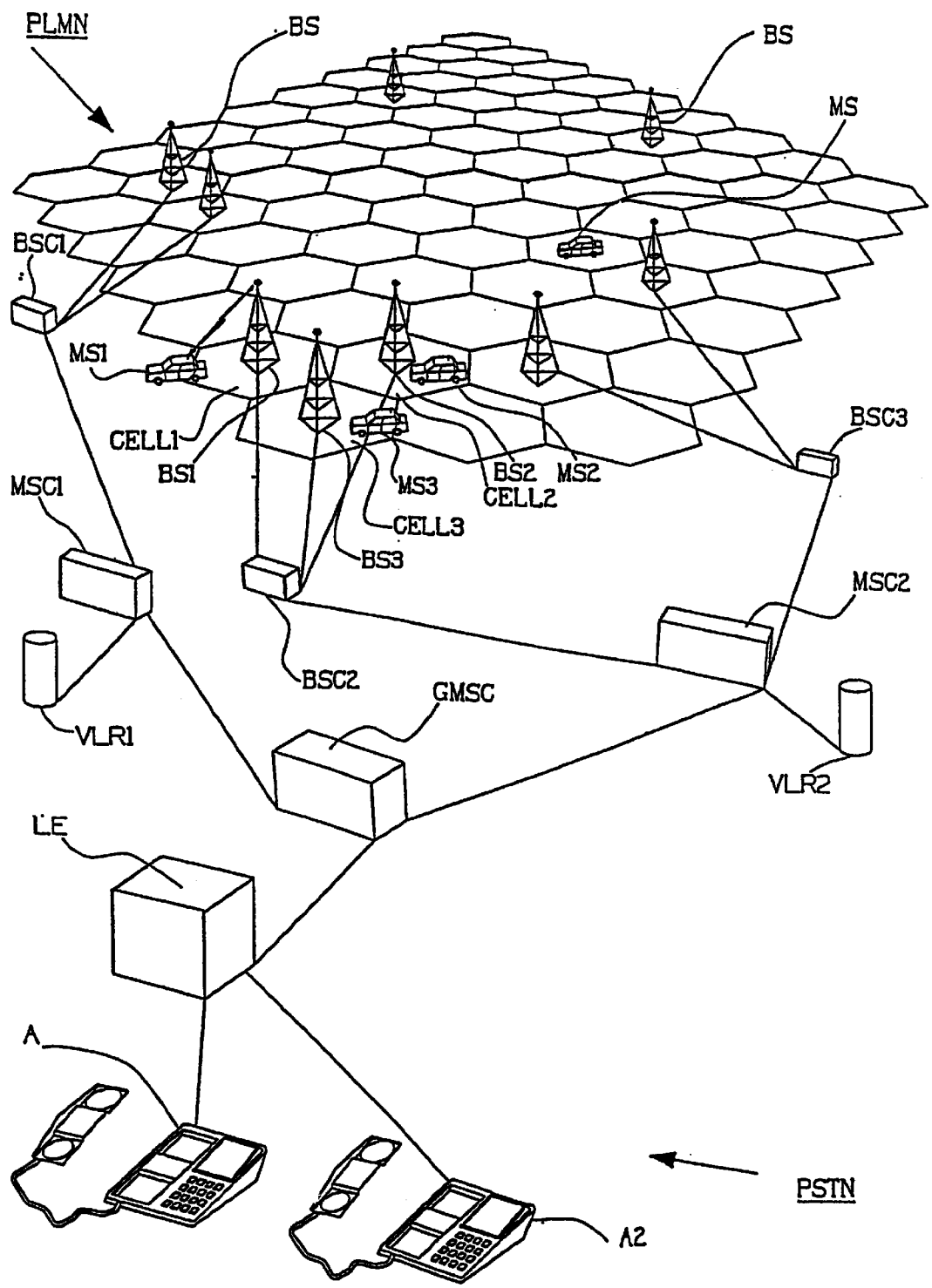
FIG. 1 is a perspective view of a cellular mobile telecommunications system which includes base stations and mobile stations.

FIG. 1 illustrates a mobile telecommunications system PLMN which includes a plurality of base stations, referenced generally BS, and mobile stations, referenced generally MS. A fixed subscriber A in a public switched telephone network establishes a bidirectional connection with the mobile station MS1 for instance, via a local exchange LE, a central gateway mobile switching centre GMSC, a mobile switching centre MSC2, a base station controller BSC2 and finally via the base station BS1 controlled by the base station controller BSC2. The bidirectional connection thus also includes a radio connection between a base station BS1 and the mobile station MS1, this connection being established by allotting appropriate radio channels thereto. FIG. 1 also shows another fixed subscriber A2.

A bidirectional radio connection includes two links, an uplink for communication from the mobile station to the base station, and a downlink for communication from the base station to the mobile station.

A channel is used for transmitting communication in one of the links, this channel comprising for instance in a TDMA system a frequency/time slot combination. Other types of channels are also conceivable, for instance frequency in an FDMA system or code in a CDMA system.

Figure 2:
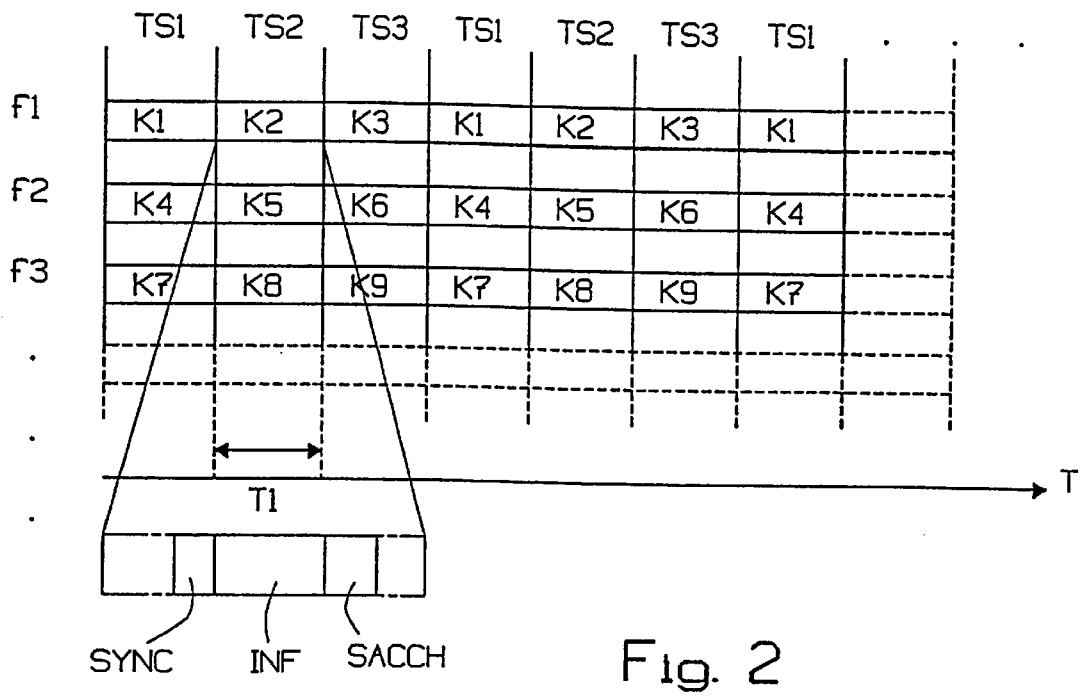
FIG. 2 is a diagrammatic illustration of the TDMA principle.

FIG. 2 shows channels in a TDMA system having three different time slots TS1, TS2 and TS3. Three different frequencies f1, f2 and f3 are shown in the vertical direction, while the time T is denoted on a horizontal axis. Each channel utilizes a specific frequency/time slot combination. For instance, channel K1 utilizes the frequency/tire slot combination f1/TS1, channel K2 utilizes the frequency/time slot combination f1/TS2, and channel K5 utilizes the frequency/time slot combination f2/TS2. The number of available channels is equal to the number of frequencies multiplied by the number of time slots. Each time slot has a given length, which in the European mobile telecommunications network GSM is T1=?) mS and in the American mobile telecommunications network D-AMPS is T1=?? mS. FIG. 2 also shows a frequency/time slot combination f2/TS2 in more detail. Among other things, transmission in a time slot includes a synchronizing signal SYNC, an information signal INF, which is the actual speech or data signal transmitted, and a control channel SACCH.

Figure 3:
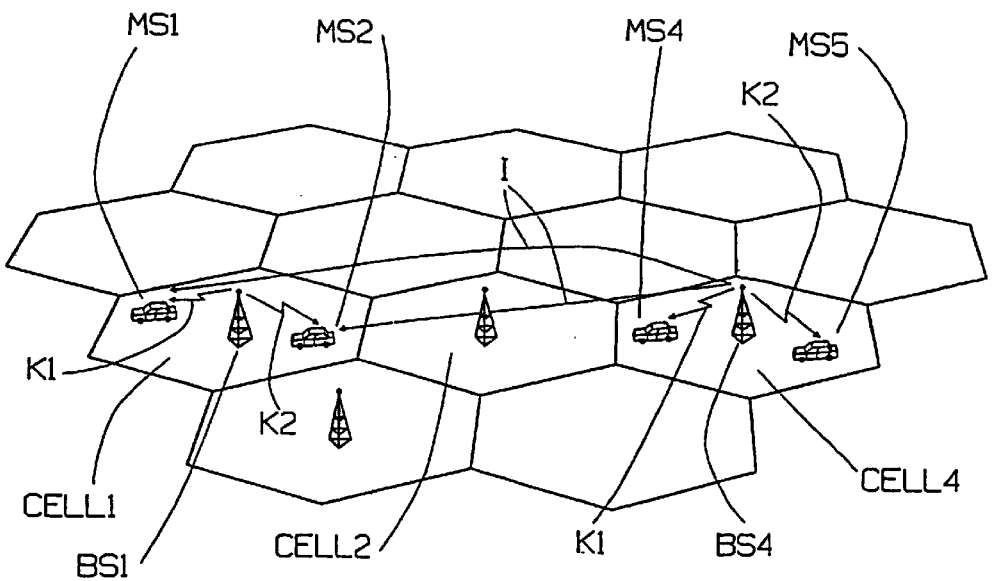
FIG. 3 illustrates in perspective base stations and mobile stations in a traffic situation.

FIG. 3 illustrates a typical traffic situation in downlink. The traffic situation shown in FIG. 3 is slightly changed with regard to the traffic situation shown in FIG. 1. In FIG. 3, the mobile station MS2 has moved to the cell CELL1, and two further mobile stations MS4 and MS5 have arrived in the cell CELL4. The mobile station MS1 and MS2 in the cell CELL1 receive radio signals from the transmitting base station BS1 on the channels K1 and K2 respectively. These channels are reused in the mobile telecommunications system PLMN, so that the mobile stations MS4 and MS5 in a cell CELL4 receive radio signals on respective connections at a given time point on channels K1 and K2 respectively from a base station BS4. These radio signals sent from the base station BS4 also reach the mobile stations MS1 and MS2 in the cell CELL1 and are there experienced as disturbing interferences I on the connections of mobile stations MS1 and MS2. The mobile station MS2 perceives the disturbances as being slightly higher than does the mobile station FS1, since the mobile station MS1 is located further from the base station BS4 than the mobile station MS2.

According to the invention, with the intention of reducing the disturbing interferences, among other things, there is followed a channel-hopping procedure in which separate hopsequence lists HL are formed for separate connections, for instance for the connections between the base station BS1 and the mobile stations MS1 and MS2. Outlined briefly, this channel-hopping procedure is effected by first measuring the interference I on all channels of the radio communications system. Each channel having an associated measured interference value is then allocated a weight value W which is contingent on the measured interference value I. The weight values W are the basis on which hopsequence lists are formed for the separate connections in both the uplink and the downlink. The hopsequence lists are then used to hop between the various channels while communication is in process. Each of the connections is allocated a respective hopsequence list in both the uplink and the downlink, via all base stations BS in the system. In this way, there is obtained a channel-hopping procedure in which channels that have the lowest interference with respect to a given connection are used more often than channels which have a higher interference level. It will be noted that interference is only one example of a parameter which will reflect the quality of a channel. It is obvious, and also lies within the scope of the invention, that other parameters which reflect channel quality may also be used, for instance the bit error rate BER, the ratio between useful and non-useful signal strengths C/I, or combinations thereof.

Figure 4B:
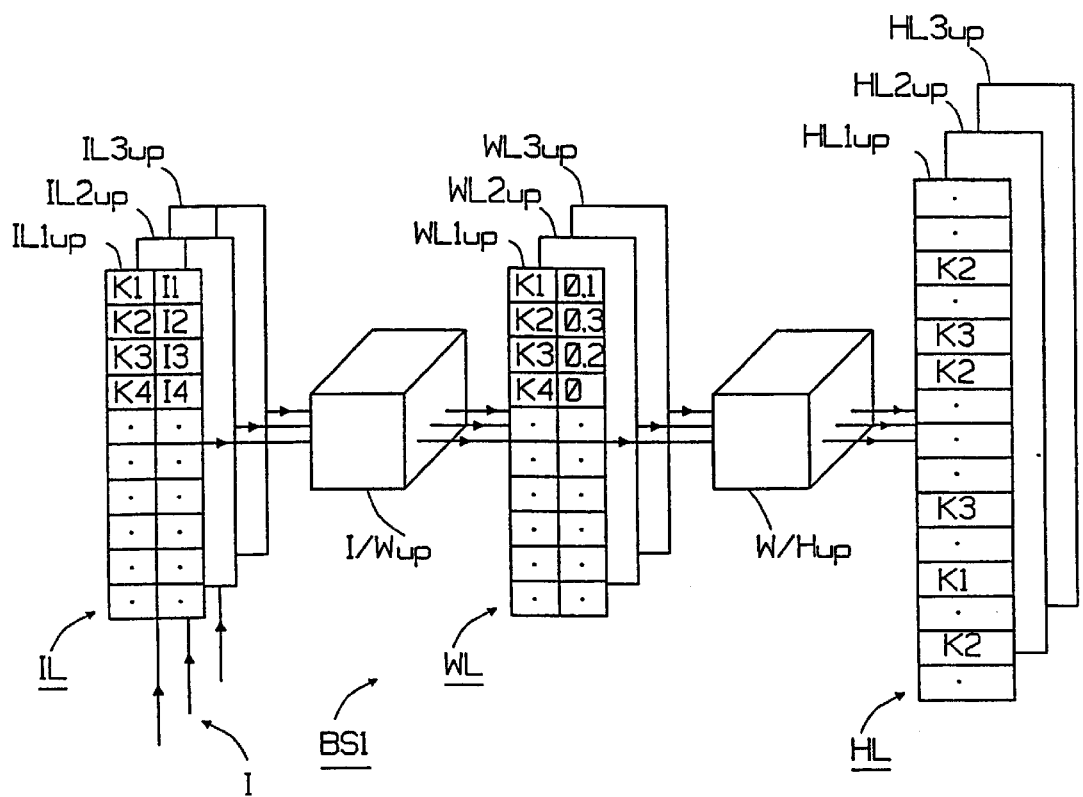
FIG. 4b is a block diagram showing different lists for uplink connections in the mobile telecommunications system.
Figure 4A:
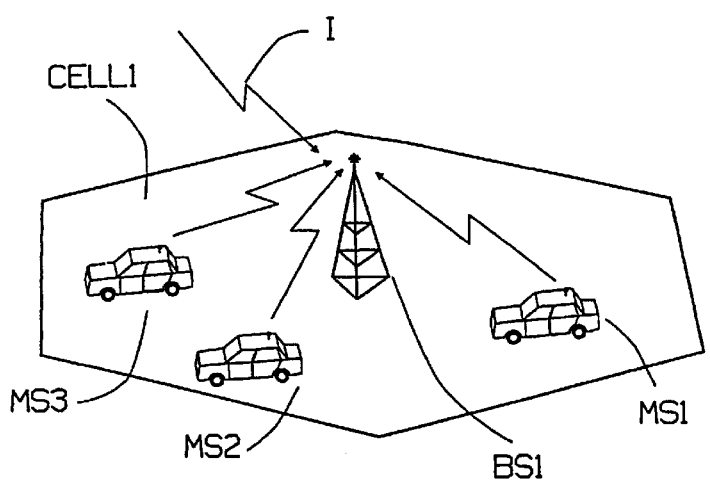
FIG. 4a is a perspective view of uplink connections.

FIG. 4a is a perspective view of the three mobile stations MS1, MS2 and MS3, each of which sends information to the base station BS1 in uplink in the cell CELL1. Channel hopping is utilized in the communication process, i.e. information is sent from respective mobile sections alternately via different channels in accordance with respective hopsequence lists. In a TDMA system, this is achieved with the use of different frequency/time slot combinations.

The method by which the hopsequence lists are generated for the different connections will now be described with reference to FIG. 4b.

FIG. 4b is a block diagram which illustrates three different interference lists $IL1_{up}$, $IL2_{up}$ and $IL3_{up}$ in the uplink of three different connections between the mobile stations MS1, MS2 and MS3 respectively and the base station BS1 in the cell CELL1 shown in FIG. 4a. Each interference list IL includes two columns, of which the first column takes up channel numbers and the second column takes up the interference values I. The channel numbers and the interference values belong together row-wise. The interference on a channel is normally comprised of disturbances from other mobile stations that transmit in other cells on the same or bordering frequencies. The interference I on the different channels is measured in the base station BS1 in a known manner, and the measured values are then delivered to respective interference lists, together with associated channel numbers as shown in FIG. 4b. The higher the interference value of a channel, the more the channel is disturbed. Interference is measured in the receiver of the base station BS1, whereafter the interference values of the various channels are stored in their respective interference lists.

The interference values I of the different channels are converted to a corresponding weight value W in a first conversion circuit $I/W_{up}$. This conversion is effected in accordance with an algorithm which will be described in more detail with reference to FIGS. 6a–c. The weight values are then inserted into weight lists WL, such as to obtain a weight list for each connection. The weight lists $WL1_{up}$, $WL2_{up}$ and $WL3_{up}$ for the three aforesaid connections are shown in FIG. 4b. Each weight list WL includes two columns, of which the first column takes up channel numbers and the second column takes up the weight values W. The channel numbers and the weight values also fall together row-wise in this case. In this embodiment, a high interference value I for a given channel implies that a correspondingly low weight value WO is allocated to the channel. The weight values are also normalized, so that the sum of all weight values n each weight list will be equal to the value 1 (one), as described below with reference to FIGS. 6a–c. In the case of this embodiment, the interference lists IL and the weight lists WL have the same number of rows as the radio communications system has channels, e.g. 100 channels, although lists containing any desired number of rows can be used.

The weight values W of respective connections are analyzed in a first allocation circuit $W/H_{up}$ which allocates channels to a respective hopsequence list $HL1_{up}$, $HL2_{up}$, $HL3_{up}$ for each connection. This allocation is effected so that a channel that has a high weight value will occur more often in the hopsequence lists $HL1_{up}$, $HL2_{up}$, $HL3_{up}$ than a channel that has a low weight value.

The hopsequence lists are configured so that a channel will not occur in two or more different hopsequence lists on one and the same row. This ensures that two or more connections will not use the same channel simultaneously within one and the same base station. The hopsequence lists are transferred to respective mobile stations, so that respective mobile stations obtain information relating to the hopsequence list to be used by that station. The hopsequence lists are transmitted from the base station to respective mobile stations via a control channel. A channel may appear in several positions on one and the same hopsequence list. The hopsequence lists are much longer than the interference lists and the weight lists. For instance, the hopsequence lists may include 1000 rows.

FIG. 4b shows the channels K1–K4 with associated measured interference values I1–I4 in the interference list $Il1_{up}$ for the connection between the mobile station MS1 and the base station BS1 in uplink. The remaining channels in the list are not shown in FIG. 4b. In the weight list $WL1_{up}$, the interference values I1–I4 have been converted to a respective weight value 0.1, 0.3, 0.2 and 0. In the hopsequence list $HL1_{up}$, the channels K1–K4 are shown included in a number which is contingent on their weight value. Since in this example channel K2 has the highest weight value, it occurs more often than the others. In this example, channel K4 has the weight value 0 and does not occur at all in the hopsequence $HL1_{up}$.

It should be noted that the interference I measured by the base station is equal for the connections in the uplink, although this is not the case with regard to corresponding downlinks.

Figure 4D:
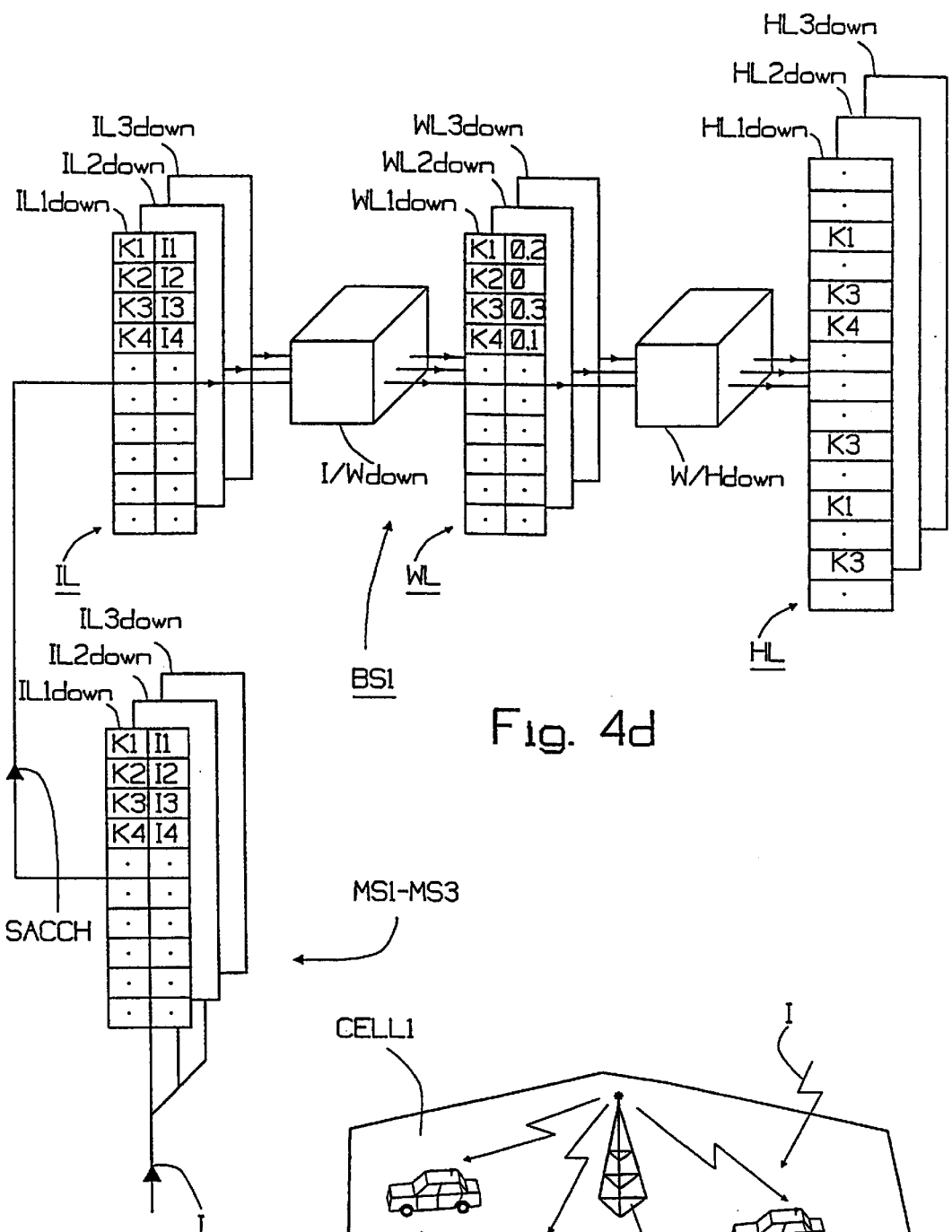
FIG. 4d is a block diagram showing different lists of downlink connections in the mobile telecommunications system.
Figure 4C:
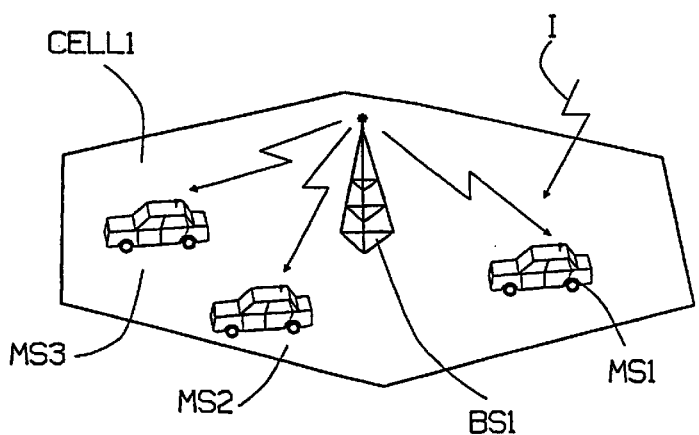
FIG. 4c is a perspective illustration of downlink connections.

FIG. 4c illustrates the mobile stations in FIG. 4a when transmitting from the base station BS1 to respective mobile stations MS1–MS3, i.e. transmission in the downlinks. The base station BS1 sends information to respective mobile stations MS1–MS2 and MS3. Each of the connections uses a respective hopsequence list.

FIG. 4d is a block schematic which includes interference lists $IL1_{down}$, $IL2_{down}$, $IL3_{down}$ for the downlinks of the three different connections between the base station BS1 and the respective mobile stations MS1, MS2, MS3. In this case, the interference is measured in respective mobile stations MS1–MS3 and the measurement values are stored in a respective interference list. The interference in the downlinks consists of the disturbances of which respective mobile stations are aware on respective channels. The disturbances originate, among other things, from base stations in other cells that transmit on the same frequency as the base station BS1 or on bordering frequencies. A channel which has a low interference value in the list $IL1_{down}$ can have a higher interference value in the list $IL2_{down}$, for instance. The interference lists are then transferred to the base station BS1, so that the base station obtains access to the interference list of each of the connections in downlink. The lists are transferred via the control channel SACCH, as indicated by a broken line between the interference list in the mobile stations and the interference lists in the base station BS1.

A general desire is for the mobile stations in the mobile telecommunications system to have small dimensions and low energy consumption. An attempt is made to avoid requiring the mobile station to carry out calculations and measurements that require a high capacity, when these calculations and measurements can instead be carried out in the base stations BS for instance, or in some central unit in the system. For this reason, the interference lists $IL1_{down}$–$IL3_{down}$ are sent to the base station BS1, because this station is better suited for converting the lists to weight lists and for allocating hopsequences. It will be understood, however, that conversion to weight lists and the allocation of hopsequence can be carried out in respective mobile stations MS1–MS3.

Similar to what has been described with reference to the uplink situation, the interference values I ar converted to weight values W in a second conversion circuit $IW_{down}$ in the base station BS1. The weight values are then inserted into weight lists WL. A weight list $WL1_{down}$, $WL2_{down}$ and $WL3_{down}$ is then obtained for each respective connection. The weight values of respective connections are then analyzed in a second allocation circuit $W/H_{down}$, which allocates channels to a respective hopsequence list $HL1_{down}$, $HL2_{down}$ and $HL3_{down}$ for respective connections. The hopsequence lists are finally sent to respective mobile stations also in the downlink case, so that respective mobile stations will obtain information relating to the hopsequence list that they shall use. The transfer of the hopsequence lists from the base station to respective mobile stations is effected via a control channel, for instance a slow associated control channel SACCH in the GSM system.

FIG. 4d shows the channels K1–K4 and associated measured interference values I1–I4 in the interference list $Il1_{down}$ for the connection between the base station and the mobile station MS1 in downlink. The Figure shows the channels in the interference list $IL1_{down}$ in the mobile station MS1 and also the channels in the interference list $IL1_{down}$ in the base station BS1. As before mentioned, the interference list $IL1_{down}$ in the mobile station MS1 is transferred to the base station BS1 via the control chanel SACCH. The remaining channels in the list are not shown in FIG. 4b. The interference values I1–I4 in the weight list $WL1_{down}$ have been converted to a respective weight value 0.2, 0, 0.3 and 0.1. The number of channels K1–K4 shown in the hopsequence list $HL1_{down}$ is contingent on the weight value. Because the channel K3 in this case has the highest weight value, this channel will occur more often. The channel K2 which, in the present case, has the weight value 0 does not appear at all in the hopsequence list $HL1_{down}$. The channel K1 appears more often than the channel K4, but not as often as the channel K3.

The conversion circuits I/W and the allocation circuits W/H may be common to both uplink and downlink.

Alternatively, the measured values of the interference I in the interference lists can be sorted in their order of magnitude, so that the channel that has the lowest interference value will be at the top of the interference list. In the case of this embodiment, the interference list is divided into two parts.

Channels are stored in the hopsequence lists HL with a repetition frequency that depends on the weight values allocated to the channels, i.e. the number of times that a channel appears in the list will depend on the weight value allotted to the channel.

It can be said in summary that the channel interference is measured for each connection in both the uplink and the downlink. An interference list IL, a weight list WL and a hopsequence list HL is found for each connection in both the uplink and the downlink. The base station BS1 and the respective mobile station MS1, MS2 and MS3 both have access to a hopsequence list for both the uplink and the downlink of a connection, as described in more detail below.

Communication between respective mobile stations MS1–MS3 and the base station BS1 is then effected by hopping between the channels in respective hopsequence lists in both uplink and downlink.

The aforedescribed channel hopping will be described in more detail with reference to FIG. 5a and FIG. 5b.

Figure 5A:
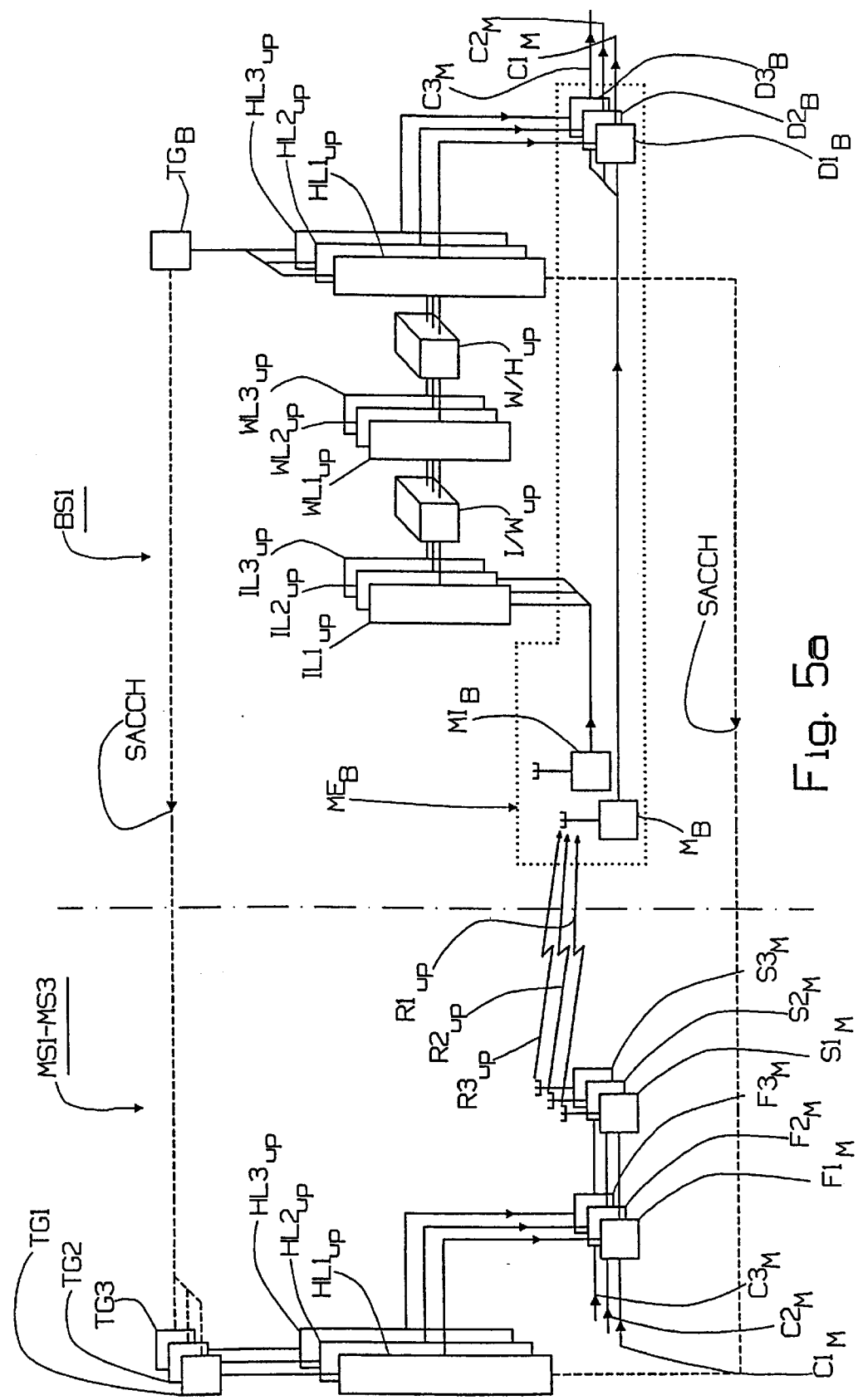
FIGS. 5a and 5b are block diagrams showing an uplink and a downlink situation respectively.

FIG. 5a is a functional block schematic which illustrates an unlink situation in which the mobile stations MS1, MS2 and MS3 send information to the base station BS1. The block schematic includes the interference lists $IL_{up}$, the weight lists $WL_{up}$, the hopsequence lists $HL_{up}$, the conversion circuit $I/W_{up}$ and the allocation circuit $W/H_{up}$ from FIG. 4a. FIG. 5a also shows radio transmitters $S1_M$–$S3_M$ for the mobile stations MS1–MS3, a receiver unit $ME_B$ in the base station BS1, and sequence generators TG1–TG3, $TG_B$. The base station BS1 has access to all channels in the radio communications system. FIG. 5a is divided into two parts by a chain line, in order to show clearly what is included in the mobile stations MS1–MS3 and in the base station BS1 respectively.

Information signals $C1_M$–$C3_M$, for instance speech or data signals from the mobile stations MS1, MS2 and MS3 respectively, are delivered to a respective channel multiplexor $F1_M$–$F3_M$ which belongs to the respective radio transmitters $S1_M$–$S3_M$. The channel multiplexors successively point out the channels of the connection from the respective hopsequence lists $HL_{up}$ in the mobile stations and pass on the information to the transmitters $S1_M$–$S3_M$. The information signals $C1_M$–$C3_M$ have then been fitted in respective channels. Modulated radio signals $R1_{up}$–$R3_{up}$ are delivered on respective outputs of the transmitters $S1_M$–$S3_M$ and sent to the receiver unit $ME_B$ in the base station BS1. It will be noted that the hop sequence lists include time discrete information, i.e. channels, whereas the information signals $C1_M$–$C3_M$ may be continuous.

The radio signals are received by a receiver $M_B$ in the receiver unit $ME_B$ of the base station BS1. The signals are then forwarded from the receiver $M_B$ and demodulated in respective connection channels selectors $D1_B$–$D3_B$. The channel selectors point out a respective channel, for instance a frequency/time slot combination, in the hopsequence lists HL in the base station BS1, and therewith contain information as to which channel shall be demodulated and to which connection the channel belongs. The information signals $C1_M$–$C3_M$ are regenerated on the output from the channel selectors, these signals then being passed to a receiving subscriber in the system. The connections between the system subscribers are maintained in this way, so that, for instance, the fixed subscriber A1 in FIG. 1 receives the information signal $C1_M$ originating from the mobile station MS1.

As the information signals $C1_M$–$C3_M$ are transferred via the radio signals $R1_{up}$–$R3_{up}$, the connections hop between the different channels in accordance with the hopsequence lists $HL1_{up}$–$HL3_{up}$. The channel sectors $D1_B$–$D3_B$ in the base station BS1 and the channel multiplexors $F1_M$–$F3_M$ in the mobile stations scan respective hopsequence lists $HL1_{up}$–$HL3_{up}$ from beginning to end, this procedure then being repeated. This provides both the base station and the mobile stations with information as to which channels shall be used for respective connections.

Respective mobile stations have copies of the hopsequence lists in the base station and the mobile stations scan respective hopsequence lists with a simultaneous start. It will be noted that there may be some time delay between the start of the scan, due to the propagation time between the mobile station and the base station.

The mobile stations receive information relating to the hopsequence lists via a control channel, for instance the control channel SACCH in the GSM system. Transmission of the hopsequence lists from the base station BS1 to respective mobile stations is shown schematically in FIG. 5a, with a broken line between the hopsequence lists in the base station BS1 and the hopsequence lists in the mobile stations MS1–MS3.

The sequence generator TGB in the base station sends to the sequence generators TG1–TG3 information as to when a hopsequence is started, therewith ensuring that the hopsequence lists can be scanned synchronously. This transmission is also effected via the control channel SACCH, as shown schematically in FIG. 5a with a broken line between the sequence generator TGB in the base station BS1 and the sequence generators TG1–TG3 in respective mobile stations MS1–MS3.

The receiver unit $ME_B$ in the base station BS1 also includes a measuring receiver $MI_B$ which measures the interference on the various channels and delivers the measured interference values to respective interference lists. The interference lists are therewith updated regularly at close intervals. The weight lists are updated by virtue of regularly scanning the updated interference lists and converting the lists to weight lists through the medium of the conversion circuit $I/W_{up}$. The hopsequence lists are updated regularly in turn, by reading-off or scanning the weight lists, the allocation circuit $W/H_{up}$ therewith updating the hopsequence lists. When the hopsequence lists have been updated, copies of the lists are sent to respective mobile stations by transmitting the content of the lists via the control channel SACCH.

Figure 5B:
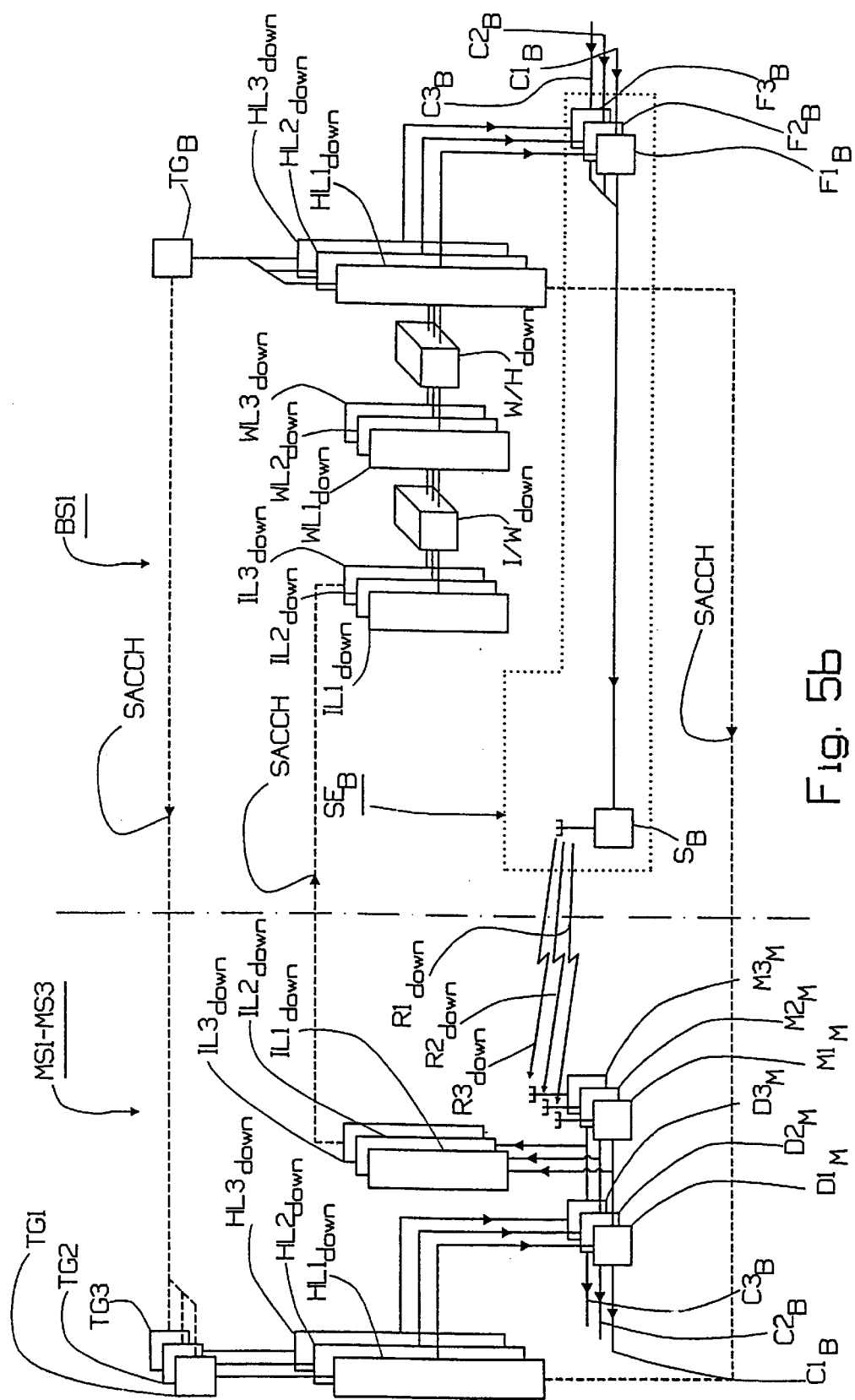

FIG. 5b is a functional block diagram which illustrates a downlink situation. In principle, FIG. 5b corresponds to FIG. 5a but with the difference that the traffic situation is in downlink, i.e. the information is sent from the base station BS1 to respective mobile stations MS1–MS3. Similar to the FIG. 5a illustration, FIG. 5b is divided into two parts by a chain line so as to separate the base station BS1 from the mobile stations MS1–MS3. As shown in FIG. 5b, information signals $C1_B$–$C3_B$ are sent from the base station BS1 to a respective channel multiplexor $F1_B$–$F3_B$ included in a transmitter unit $SE_B$. The channel multiplexors point out the channels from respective hopsequence lists $HL1_{down}$–$HL3_{down}$ in an ordered sequence, wherein the information signals $C1_B$–$C3_B$ are successively overlaid on the channels pointed out from respective hopsequence lists. The modulated information signals are then forwarded to the transmitter $S_B$ which then delivers modulated radio signals $R1_{down}$–$R3_{down}$ which are sent to respective receivers $M1_M$–$M3_M$ in respective mobile stations MS1–MS3. The received radio signals are forwarded from there to a respective channel selector $D1_M$–$D3_M$. Each of the channel selectors points out a channel from respective hopsequence lists $HL1_{down}$–$HL3_{down}$ at the same time, copies of these lists being found in respective mobile stations. Respective radio signals are then demodulated in accordance with the channel indicated. The information signals $C1_B$–$C3_B$ are regenerated on the output of the channel selectors and thereafter reach respective subscribers of the mobile stations MS1–MS3. It will be understood that all radio signals $R1_{down}$–$R3_{down}$ can reach all receivers $M1_M$–$M3_M$, but that only those channels which belong to the hopsequence list of a given mobile station are demodulated by this mobile station. This will be described in more detail below.

Each of the receivers $M1_M$–$M3_M$ also includes a measurement receiver which measures the interference on the various channels for respective connections. These measurement receivers are not shown in FIG. 5b, but in principle correspond to the measurement receiver $MI_B$ shown in FIG. 5a. The interference lists IL in the mobile stations are updated, by regularly measuring interference values in the measurement receivers and sending new interference values to respective interference lists $IL1_{down}$–$IL3_{down}$. Copies of the interference lists in the mobile stations are then sent to the base station via a control channel, for instance the control channel SACCH. This is shown in FIG. 5b with a broken line between the interference lists in respective mobile stations MS1–MS3 and the interference lists in the base station BS1.

Communication on a connection in downlink between the base station BS1 and one of the mobile stations MS1–MS3 is effected by using the hopsequence list that belongs to the connection. The mobile station and the base station reads the hopsequence list for said connection from beginning to end synchronously with one another, this procedure then being repeated cyclically. The sequence generator TG1–TG3 for the mobile stations and the sequence generator $TG_B$ for the base station BS1 ensure that the hopsequence lists are scanned synchronously. The sequence generator $TG_B$ in the base station sends information to the sequence generators TG1–TG3 in the mobile stations on the control channel SACCH when scanning of respective hopsequence lists shall commence.

Figure 6A:
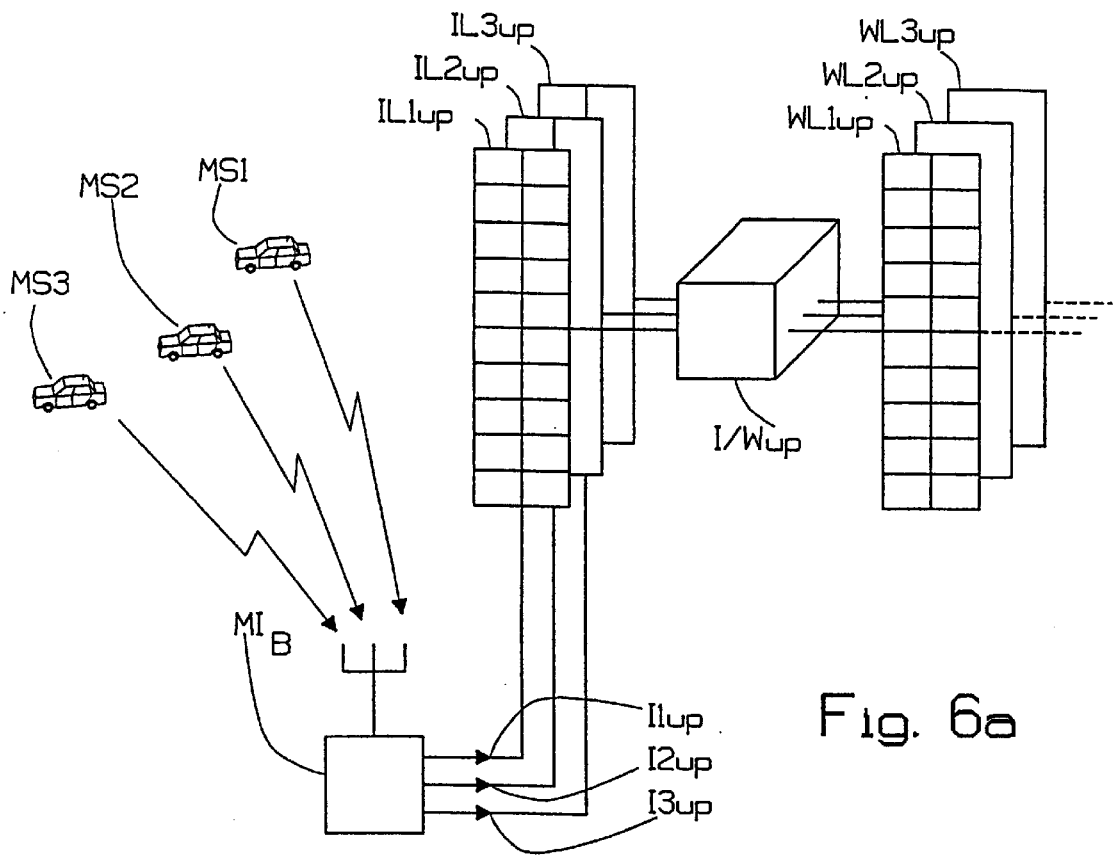
FIG. 6a is a block diagram which includes lists and a measuring receiver.

FIG. 6a shows the conversion circuit $I/WN_{up}$ and the interference lists in uplink $IL1_{up}$–$IL3_{up}$ and the weight lists $WL1_{up}$–$WL3_{up}$ from FIG. 4b. The interference values $I1_{up}$–$I3_{up}$ received from the measuring receiver $MI_B$ are stored in a separate interference list for each of the three different connections between the mobile stations MS1–MS3 and the base station BS1. The interference values of all channels of the radio communications system in uplink are measured for each of the connections. The interference list will thus have as many rows as the radio communications system has channels. The conversion circuit $I/W_{up}$ scans respective interference lists $IL1_{up}$–$IL3_{up}$ and converts the interference values to corresponding weight values W in accordance with an algorithm described below in-conjunction with the description of FIG. 6b. The weight values are stored in corresponding weight lists $WL1_{up}$–$WL3_{up}$ these lists also having as many rows as the radio communications system has separate channels. It will be noted that the interference lists and the weight lists need not necessarily have as many rows as the radio communication system PLMN has separate channels.

Figure 6B:
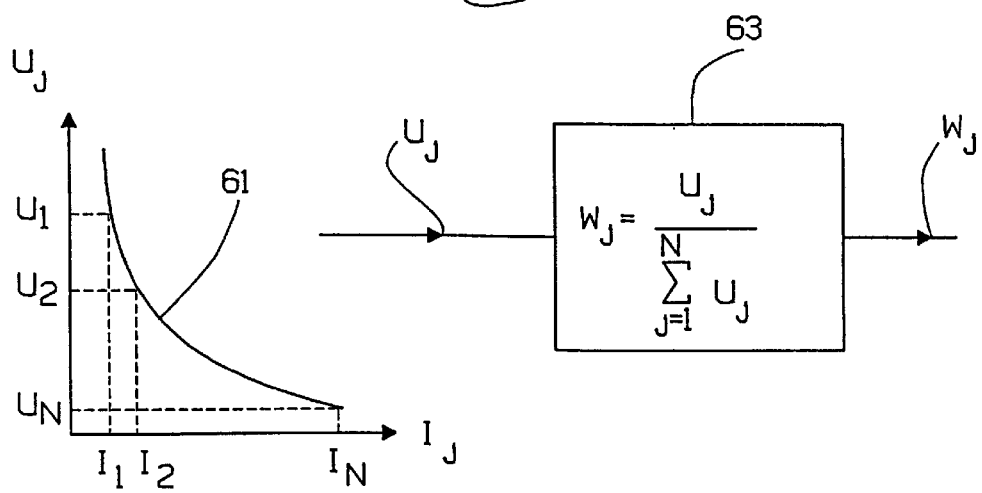
FIG. 6b is a diagram which includes a conversion curve for converting interference to weight values, a block schematic which illustrates a normalizing circuit, and a block schematic of a list for converting interference to weight values.

FIG. 6b shows an algorithm for converting or transforming the interference values to weight values. The weight values are also normalized, so that said values will lie between 0 (zero) and 1 (one). According to the illustrated conversion curve 61, a selected interference value $I_j$ is converted to a corresponding non-normalized weight value $U_j$. In the case of the present example, the curve 61 is monotonously decreasing, although it may other forms as shown in FIG. 6c with three other curves 64, 65 and 66. According to curve 61, the interference values $I_j$ are divided into a lower non-normalized weight value $U_j$ the higher the magnitude of interference value $I_j$. The curve 61 may be stored in a memory register 62 as discrete values with a plurality of rows according to FIG. 6b. Each row in the memory register accommodates an interference value $I_j$ and a corresponding non-normalized weight value $U_j$. The non-normalized weight values $U_j$ are then normalized to normalized weight values $W_j$ in a normalizing circuit 63 included in the conversion circuit $I/W_{up}$. Each of the non-normalized weight values $U_j$ for a connection are divided in the normalizing circuit 63 by the sum of all non-normalized weight values. For instance, the interference values $I1_{up}$ on the different channels for the connection between the mobile station MS1 and the base station BS1 in uplink are converted to corresponding non-normalized weight values $U_j$ by using the curve 61 and the memory register 62. The non-normalized weight values are converted, or transformed, in turn to normalized weight values $W_j$. The weight value normalizing algorithm has the form:

$$W_j = \frac{U_j}{\sum_{j=1}^{N} U_j} \quad (1)$$

where N is the number of separate channels in the system.

The interference lists $IL1_{down}$–$IL3_{down}$ are transformed in downlink to weight list $WL1_{down}$–$WL3_{down}$ in a corresponding manner. The difference is that the interference is measured in measuring receivers included in the receivers $M1_M$–$M3_M$ in respective mobile stations MS1–MS3. Downlink interference lists are established in each of the mobile stations MS1–MS3, copies of these lists being sent to the base station BS1, by transmitting the interference values via the control channel SACCH. Conversion to weight values is then effected in the same manner as that described above with reference to FIGS. 6a and 6b.

FIG. 6c shows the three different conversion curves 64–66. The curve 64 is a straight line with negative slope, wherein the interference values $I_j$ and the non-normalized weight values $U_j$ are inversely proportional. The curve 65 is a type of stepped curve in which the interference values are divided into different intervals. Individual intervals are associated with individual weight values. The interference values are assigned the same weight value within a given interval. The curve 66 is, in principle, a quarter-circle curve.

Figure 8:
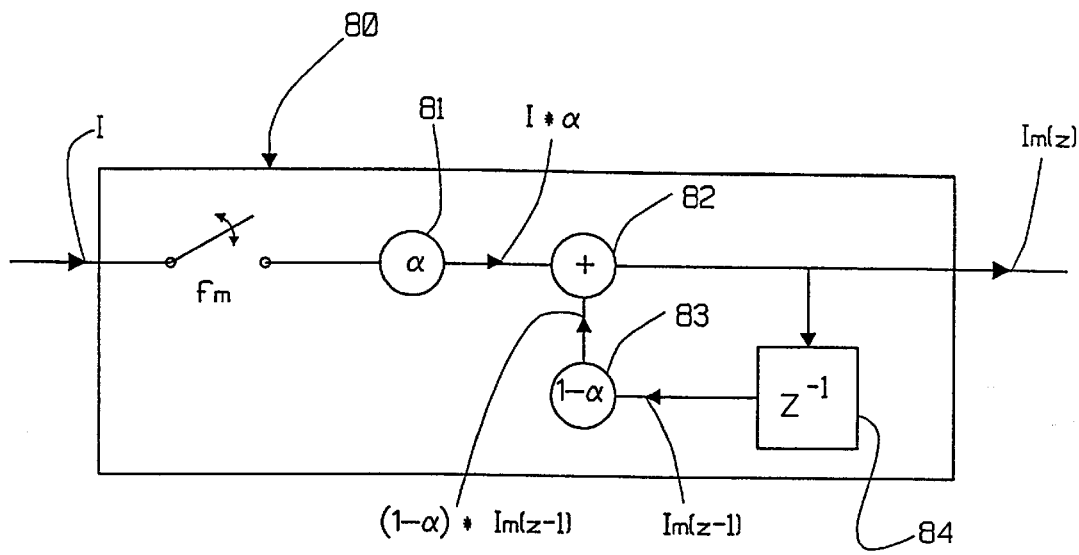
FIG. 8 is a block schematic illustrating a mean value former.

The interference lists are updated regularly, for instance each 20th millisecond. A temporary change of the interference values caused by temporary disturbances on the channels can result in relatively large changes in the interference lists. The interference values return to a more normal level when the temporary disturbances disappear, wherein relatively large changes again occur in the interference lists. As shown in FIG. 8, a mean value circuit 80 can be used to avoid temporary disturbances having an excessive effect on the interference lists. The interference values I are multiplied by a feedback constant α in a first multiplier 81. A signal I*α is then delivered on the output of the multiplier 81 and received by an adder 82, which in turn produces a mean value of the interference Im. This mean value is fed back to the adder 82 via a delay circuit 84 and a second multiplier 83. The second multiplier 83 multiplies the delayed mean value of the interference by a factor 1–α. The mean value of the interference then becomes a sliding mean value of all earlier measured interference values. When the feedback constant α is relatively small, for instance 1/1000, there is obtained a sliding mean value where the temporarily measured interference value will only influence the mean value Im by a factor of 1/1000. The mean value circuit 80 can, in principle, be considered as a monopoly filter which filters the interference. The new interference values I are fed in with a frequency fm which is inversely proportional to the feedback constant α.

The weight lists WL are updated regularly, by feeding the interference values into the conversion circuit I/W which then delivers corresponding weight values. Updating is effected with the same frequency as that in which the interference is fed in, i.e. the frequency fm.

The hopsequence lists are updated in a corresponding manner, by feeding the weight values from the weight list WL into the allocation circuit W/H, which delivers channel numbers to the hopsequence lists in accordance with the updated weight values, as described in more detail below.

The interference lists IL and the weight lists WL have the same number of rows as the radio communications system has channels, e.g. 100.

The hopsequence lists have many more positions, for instance 1000 positions. The allocation circuit W/H positions channels in the hopsequence lists. A channel can appear in several positions in one and the same hopsequence list. The number of times that a channel appears in a hopsequence list will depend totally on the registered weight value of the channel. A high weight value will mean that the channel will occur often in a hopsequence list. For instance, if a channel has been allocated a normalized weight value ½ for a given connection, this channel will, on average, reoccur on each alternate position in a corresponding hopsequence list. When a hopsequence list contains 1000 positions, this would mean that the channel occurs in 500 of these 1000 positions. A 0 weight position would mean that the channel is not found on the hop sequence list.

Figure 11:
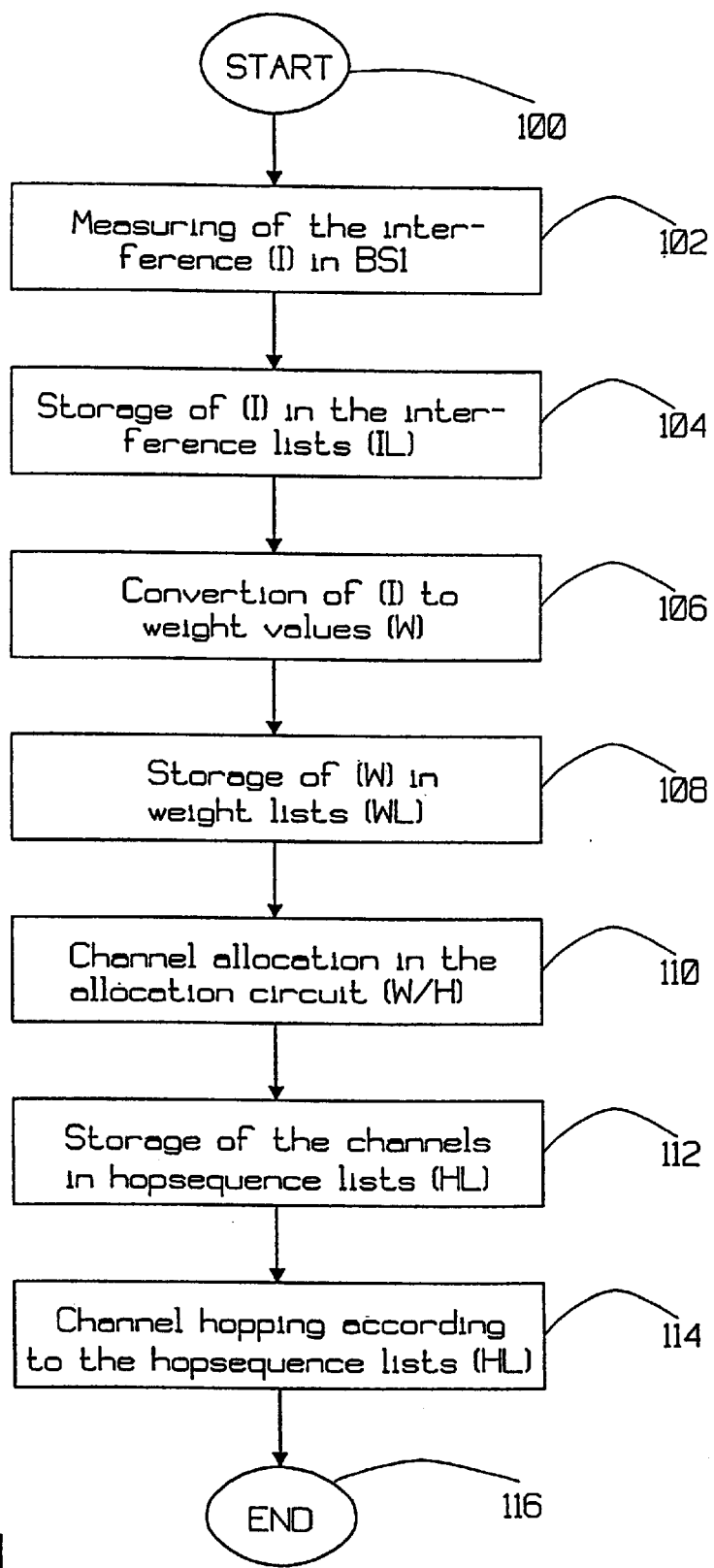
FIG. 11 is a flowsheet which illustrates a channel hopping method.

FIG. 11 is a flowsheet which illustrates an inventive method for channel hopping in uplink, which coincides in principle with the method described above with reference to FIG. 5a. The flowsheet shown in FIG. 11 begins at stage 100 and continues with stage 102 in which the interference I is measured in the measuring receiver $MI_B$. Measuring of the interference is carried out for all channels on separate connections between the mobile stations MS1–MS3 and the base station BS1. At stage 104, the measured interference values I are stored in interference lists $IL1_{up}$–$IL3_{up}$. Separate connections have separate interference lists. In stage 106, the interference values are converted to corresponding weight values W in the conversion circuit $I/W_{up}$, these weight values W being stored in weight lists $W1_{up}$–$W3_{up}$ in the next following stage 108 in the flowsheet. In stage 110, the weight values W are read into the allocation circuit $W/H_{up}$, which allocates channels to the respective connections between the mobile stations MS1–MS3 and the base station BS1, these allocated channels being stored in the hopsequence lists $HL1_{up}$–$HL3_{up}$ in the next following stage 112 in the flowsheet. The method then continues in stage 114, wherein channel hopping is effected in accordance with the generated hopsequence lists. The method is terminated in stage 116, and then regularly repeated. FIG. 11 describes a method in uplink. The method in downlink is implemented in a similar way and will not therefore be described in detail.

The allocation circuit W/H arranges the channels so that one and the same channel will not occur in one and the same position in one or more hopsequence lists. This avoids a channel collision, i.e. a situation in which two or more connections in one and the same cell use one and the same channel at the same time.

Figure 10:
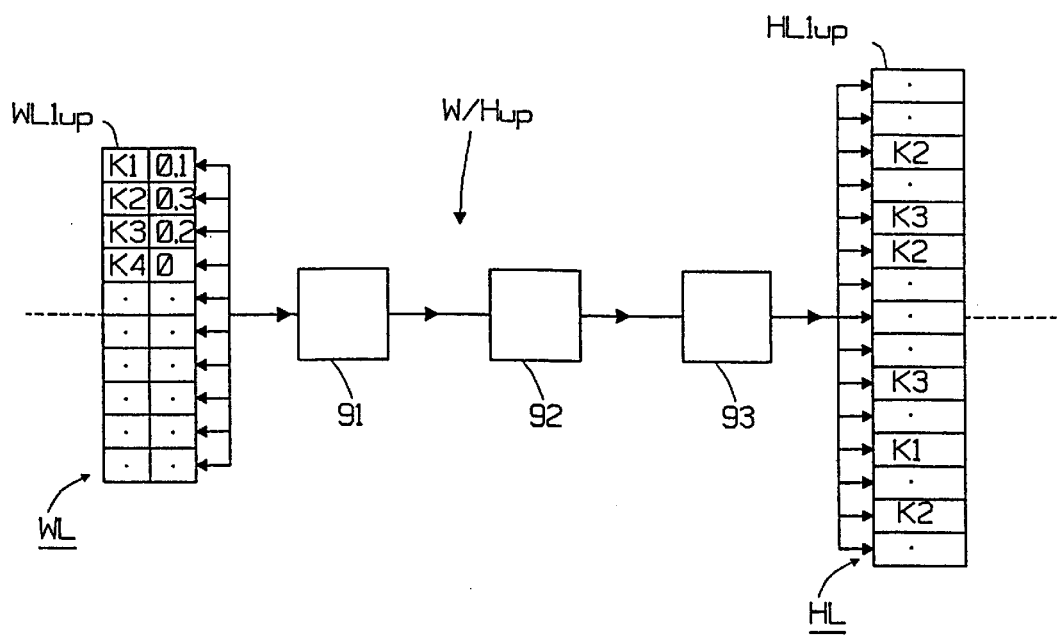
FIG. 10 is a block diagram of a conversion circuit.

FIG. 10 illustrates the allocation circuit $W/H_{up}$ in FIG. 4b in more detail. The normalized weight values in the hopsequence list $W1_{up}$ are fed successively into a multiplier 91, which multiplies the weight values by a factor M corresponding to the number of rows in the hopsequence list $HL1_{up}$. In the case of this embodiment, the hopsequence list $HL1_{up}$ includes 1000 rows. The product is rounded off to an even number and is forwarded to a random number generator 92 which generates an equal number of mutually different random numbers between 1–M as the product between the inserted weight value and M. The generated random numbers are then stored in a memory circuit 93, which in turn places the channel belonging to the inserted weight value into the hopsequence list on those rows denoted by the generated random numbers. This procedure is then repeated for all weight values with associated channels in the weight list $WL1_{up}$. For instance, the weight value 0.1 for the channel K1 is read into the multiplier M, which then delivers the factor 0.1*1000=100 to the random number generator 92, which then generates 100 random numbers between 1–1000. The generated random numbers are then inserted into the memory circuit 93, which places the channel K1 in 100 of the 1000 positions in the hopsequence list $HL1_{up}$. This procedure is then repeated for channel K2, for which 300 different random numbers are generated. These random numbers are also different from the earlier generated random numbers, so that no two channels will be allocated the same position in the hopsequence list $HL1_{up}$.

A respective hopsequence list is generated for the weight lists $WL2_{up}$ and $WL3_{up}$ in a corresponding manner. The same channel number will sometimes reappear at certain corresponding positions in the various hopsequence lists. For instance, the channel K1 may be placed at position 15 in both the hopsequence list $HL1_{up}$ and the hop sequence list $HL2_{up}$. However, the risk of this happening is very small and if it should happen then any interruption in communication will be scarcely discernable.

Alternatively, the channels can be sorted so that channel K1 is placed in the 100 first positions, the channel K2 is placed in the next following 300 positions, and so on. In order to avoid collision between channels in different hopsequence lists, the various channel groups in different hopsequence lists are displaced so that one and the same channel group will not overlap the same channel group in another hopsequence list.

Figure 12:
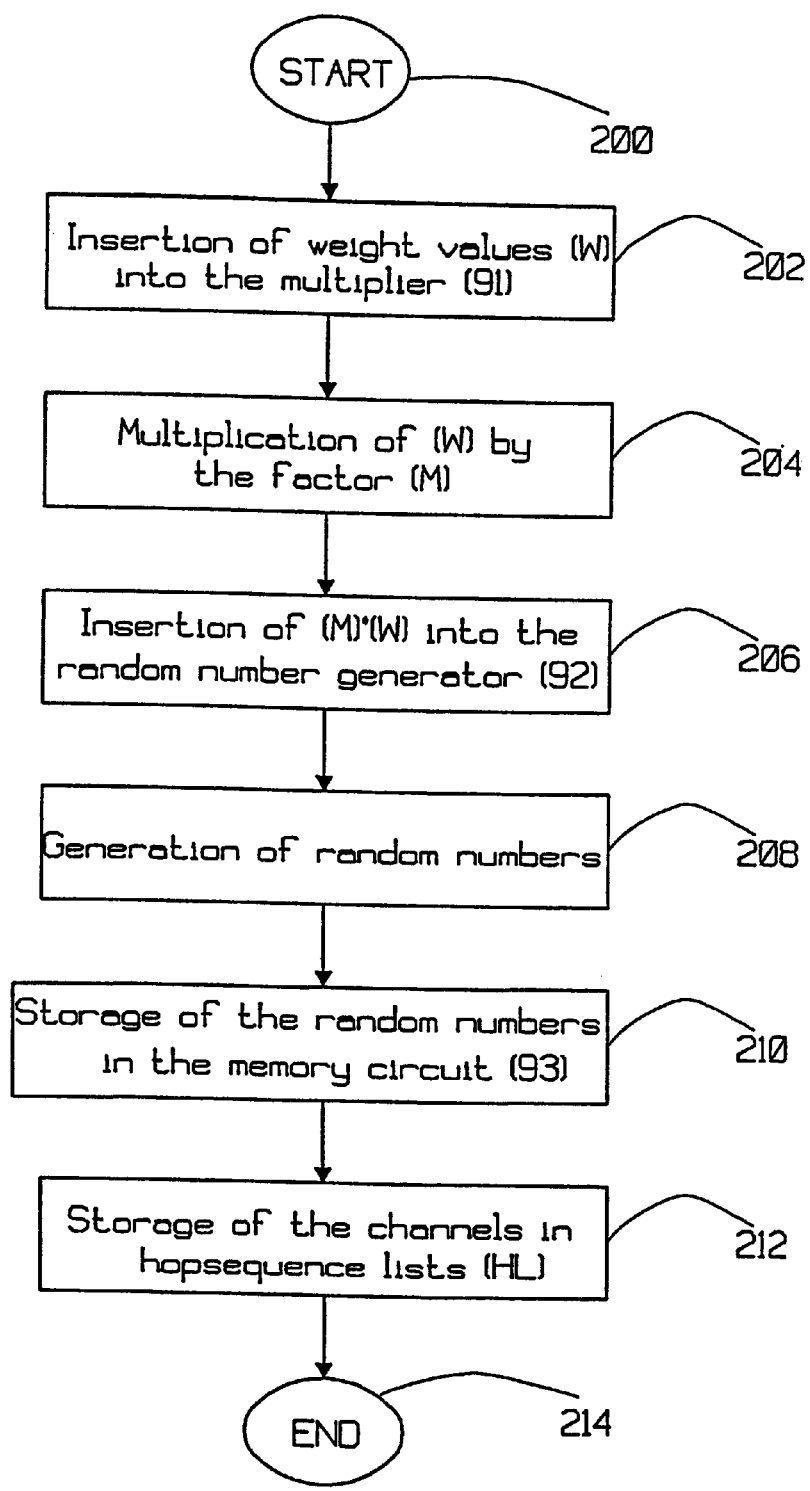
FIG. 12 is a flowsheet which illustrates a method of allocating channels to hop sequence lists.

FIG. 12 is a flowsheet which illustrates the inventive method of allocating channels in uplink to hopsequence lists. This method corresponds to the description of FIG. 10, where the allocation circuit $W/H_{up}$ and its function are described. The method commences at stage 200 and continues to stage 202 in which the weight values W in the weight lists $WL1_{up}$–$WL3_{up}$ are inserted into the multiplier 91. At stage 204, the inserted weight values are multiplied gradually by a factor M which is an integer and is equal to the number of rows in a hopsequence list. In the next following stage 206, the product M*W between the factor M and the different weight values is inserted gradually into the random number generator 32. The method then proceeds to stage 208, in which random numbers between 1–M are generated. The random numbers are integers and the number of random numbers generated coincides with the factor M*W. The random numbers generated for the separate channels are then stored in the memory circuit 93 in stage 210. The random numbers stored in the memory circuit 93 are then used in stage 212 to store the channels in the hopsequence lists $HL1_{up}$–$HL3_{up}$ in positions given by the generated random numbers. The method is terminated at stage 214, but is repeated regularly. The method in downlink is equivalent and will not be described in detail.

FIG. 6d illustrates how the interference values I are measured in the measuring receiver $MI_B$ in uplink. The measuring receiver $MI_B$ is included in the receiver unit $ME_B$ in the base station BS1. The measuring receiver receives the interference values from the respective mobile stations and sorts out the interferences $I1_{up}$–$I3_{up}$ from the respective mobile stations in a circuit 67. The measurement values are then sent to respective interference lists, where they are stored.

Relatively comprehensive calculations and signal processes are required when all connections are to be allocated unique hopsequence lists in both the uplink and the downlink. These calculations can be reduced, by introducing common lists as described in more detail below. A simplified embodiment will be described in the following.

In the base station BS1, the interference in uplink is measured and registered for all channels to which the radio communications system PLMN has access, as earlier described with reference to FIG. 5a. Since the interference in uplink is the same for all connections within the cell CELL1, a common interference list IL4$_{up}$ can be used for the connections in uplink, in accordance with FIG. 9a. For instance, the connection between the base station BS1 and the mobile station MS1 shows the same interference in uplink as the connection between the base station BS1 and the mobile station MS2 in uplink. The base station BS1 has access to all channels in the system for which the interference in uplink is registered and arranged in the common interference list for uplink IL4$_{up}$.

The interference in downlink is registered in the simplified embodiment in accordance with the following. The interference is measured for the connections between the base station BS1 and the mobile stations MS1–MS3 in downlink, and is stored in the interference lists IL1$_{down}$–IL3$_{down}$ in the same way as that described with reference to FIG. 5b. There is then generated an interference list IL4$_{down}$ as a mean value of all the interference values in downlink. A mean value is generated for each channel, such that, e.g., the interference value of channel K1 in the interference list IL4$_{down}$ constitutes a third of the sum of the interference values for the channel K1 in the interference lists IL1$_{down}$–IL3$_{down}$. Thus, there is one interference list for the uplink IL4$_{up}$ and one interference list for the downlink IL4$_{down}$. There is formed from these lists a common interference list IL4$_{max}$ which includes the highest of the interference values for each channel from one of the interference lists in the uplink IL4$_{up}$ and the downlink IL4$_{down}$, in accordance with FIG. 9a. This thus results in a single interference list IL$_{max}$ containing the interference values for the various channels for all connections in both uplink and downlink for the connections in the cell CELL1.

The best channels are then selected from the list IL$_{max}$, i.e. those channels that have the lowest interference values. The number of channels selected equals the number of connections within the cell CELL1. This example includes three connections, and consequently three channels are selected. The selected channels are then allocated an equally as large weight value and the sum of the weight values is equal to one. Thus, in the present example, the channels are each allocated a weight value of ⅓. Channel hopping is now implemented for the three different connections, such that each connection will hop between all of the selected channels with equally as great probability, for instance in accordance with a hopschedule HS1 shown in FIG. 9d. The hopschedule is repeated cyclically, such that the first connection will utilize the hopsequence 1, 2, 3, 1, 2, 3 . . . , the second connection will utilize the hopsequence 3, 1, 2, 3, 1, 2 . . . and the third connection will utilize the hopsequence 2, 3, 1, 2, 3, 1 . . . , as evident from FIG. 9d.

The hopschedule HS1 shown in FIG. 9d includes channels whose interference has been measured either in uplink or in downlink. When the interference of a channel is measured in uplink for instance, the channel of the connection in downlink is obtained by using the so-called duplex spacing. When a channel in uplink is known, the system has knowledge of corresponding downlink channels, since the channels in downlink and in uplink are separated by a spacing which is known to the system. In a FDMA system, this spacing is equal to a radiochannel spacing, whereas the spacing in a TDMA system may either consist of a radio-channel spacing, a time-slot spacing or a combination thereof.

In an alternative embodiment, the base station BS1 takes into account whether a channel is used in the cell CELL1 when the interference is registered. This is explained below.

The interference on the connections in downlink is registered in accordance with the following description made with reference to FIG. 9b. The base station channels are divided into two groups A and B. The first group A comprises channels used in the cell and the other group B comprises channels that are not used in the cell. The interference on the different channels in the first group is registered at regular time intervals in the mobile station for each of the connections, these registered interference values being sent to the base station via a control channel. The interference/signal strength SS is measured on the channels in the second group of channels not used in the base station. Interference on the channels comprising the second group B is not measured as often as the interference on the channels in the first group A.

The interference in downlink may alternatively be registered with the aid of measuring probes distributed in the cell and connected to the base station. This enables the interference situation in downlink to be mapped in a given area, even though no active mobile stations are present in this area.

The mobile station measures the interference in downlink on the channels in the first group A only when the station itself uses the channels. Remaining time slots measure the signal strength of the channels in the other group B. In this way, less capacity is required for measuring, or determining, the interference situation in a cell.

Each of the mobile stations establishes an interference list and reports to the base station BS1, via a control channel, the C/I value and the signal strength SS on those channels in the downlink used by the base station, i.e. the channels in the first group A, and the signal strength SS of those channels that are not used by the base station, i.e. the channels in the second group B.

FIG. 7 shows how the interference values I are measured in the measuring receiver MI$_B$ in uplink. The measuring receiver MI$_B$ is included in the receiver unit ME$_B$ in the base station BS1. When a channel is occupied and the interference of the channel is registered at the same time, the actual speech signal intended to be transmitted via said channel is also perceived as a disturbing signal. The measuring receiver then compensates for the interference caused by the speech signal, so that only the useless interference is registered. Assume that channel K1 is used in uplink between the mobile station MS1 and the base station BS1. Also assume that the interference in uplink on the channel K1 for the connection between the mobile station MS2 and the base station BS1 shall be registered. The measuring receiver will then subtract from the total registered interference values the signal strength SS from the speech signal that is transmitted from the mobile station MS2 to the base station BS1. This compensation may be effected in accordance with FIG. 7. The measuring receiver MI$_B$ includes a first registration circuit 71 which registers the bit error rate BER$_j$ on, e.g., the channel K1 and converts this value to a corresponding C/I value. A second registration circuit 72 registers the C/I value obtained from the first registration circuit 71 and registers the signal strength SS. The output of the second registration circuit 72 then delivers the interference value I$_j$ of the channel. If the channel is occupied when registration takes place, compensation is thus made for the signal strength SS, while when the channel is unoccupied, the signal strength SS is 0 (zero).

When updating the interference values, the fact that the interference on the channels belonging to the second group B is not measured as often as the interference on the channels belonging to the first group A is taken into account, by correcting the feedback constant α according to FIG. 8.

The best channels are then selected from the common interference list $IL_{max}$ and a hopschedule is generated in the afore-described manner.

The above example includes three connections in the cell CELL1. Naturally, the number of connections will be more in practice. The hopschedule can be extended to apply to more connections, for instance seven connections. The number of channels selected will then be equal to the number of connections in the cell belonging to the base station BS1 concerned, i.e. 7 (seven) connections. The selected channels are then each allocated an equally as large weight value and arranged in a weight list, in accordance with the simplified embodiment. The weight values are normalized so that the sum of the weight values will be one (1) and each of the selected channels will be allocated the weight $1/7$.

Channel hopping is now utilized for the seven different connections, such that each connection hops between all of the selected channels with the same degree of probability, for instance in accordance with a hopschedule HS2 shown in FIG. 9c. The hopschedule HS2 is repeated cyclically in a manner corresponding to that described for the hopschedule HS1 with reference to FIG. 9d.

In a further embodiment of the invention, only those channels whose measured interference lies beneath a given threshold value are used. This can cause certain channels to be blocked out and excluded from the hopsequence.

The base stations of traditional mobile radio systems are permanent or fixed. However, the invention can also be applied in mobile radio systems where a base station may be mobile. This may be relevant when needing to increase communication capacity temporarily in different places.

A method comprising channel hopping according to the invention results in that the use of the channels is optimized and that interference on radio connections is decreased.

It will be understood that the invention is not restricted to the aforedescribed and illustrated exemplifying embodiments thereof, and that modifications can be made within the scope of the following Claims.

What is claimed is:

1. A method of channel hopping in a radio communications system (PLMN), wherein the system (PLMN) includes at least one first radio station (BS1) and one second radio station (MS1) between which radio connections can be established through the medium of radio channels (K1–K4), comprising:

measuring a channel quality parameter (I, BER, C/I) for separate radio channels;

allocating weight values (W) to individual channels in accordance with the measured channel quality parameters (I, BER, C/I), wherein the weight values are derived by converting the measured channel quality parameters using a conversion function;

generating a hopsequence in accordance with the allocated weight values (W) such that each of said radio channels will be repeated in said hopsequence a number of times which is determined by the weight value of each radio channel relative to the weight values of others of said radio channels; and channel hopping between the channels using the generated hopsequence for communication between the first radio station (BS1) and the said at least one second radio station (MS1).

2. A method according to claim 1 further including the step of arranging the allocated weighted values (W) in a weight list (WL) in a falling order of magnitude.

3. A method according to claim 2, wherein the weight values (W) determine the number of times that a channel will occur in the hopsequence (HL).

4. A method according to claim 2 further including the step of normalizing the weight values (W) so that the sum of the weight values (W) in a weight list (WL) will be one (1).

5. A method according to claim 1, wherein the channel quality parameters (I, BER, C/I) is measured by a receiver.

6. A method according to claim 1, wherein the channel quality parameter (I, BER, C/I) is a ratio between useful and disturbing signals strength (C/I).

7. A method according to claim 1, wherein the channel quality parameter (I, BER, C/I) consists in the interference (I).

8. A method according to claim 1, wherein the channel quality parameter (I, BER, C/I) consists in the bit error rate (BER).

9. An arrangement for channel hopping in a radio communications system (PLMN), wherein the system (PLMN) includes at least one first radio station (BS1) and one second radio station (MS1) between which radio connections can be establish through the medium of radio channels (K1–K4), comprising:

a measuring receiver ($MI_B$) for measuring a channel quality parameter (I, BER, C/I) for individual radio channels (K1–K4);

a conversion circuit (I/W) for allocating weight values (W) to individual channels in accordance with the measured channel quality parameters (I, BER, C/I), wherein the weight values are derived by converting the measured channel quality parameters using a conversion function; and an allocation circuit (W/H) for generating a hopsequence in accordance with the allotted weight values (W) in a manner such that each of said radio channels (K1–K4) will be repeated in said hopsequence a number of times which is determined by the weight value of each radio channel relative to the weight values of others of said radio channels; and wherein the system is adapted to channel hop between the channels using the generated hopsequence, for communication between the first radio station (BS1) and the at least one second radio station (MS1).

10. An arrangement according to claim 9, wherein the conversion circuit (I/W) and the allocation circuit (W/H) are adapted to allocate weight values (W) to individual channels in accordance with the measured channel quality parameters (I, BER, C/I), and to generate said hopsequences (HL) in accordance with the allotted weight values (w).

11. An arrangement according to claim 10, wherein the allotted weight values (W) are arranged in a weight list (WL) in a falling order of magnitude.

12. An arrangement according to claim 10, wherein the weight values (W) determine how many times a channel will occur in the hopsequence (HL).

13. An arrangement according to claim 10 further including a normalizing circuit (63) which functions to normalize the weight values (W) so that the sum of the weight values in a weight list (WL) will equal one (1).

14. An arrangement according to claim 9, wherein the channel quality parameter (I, BER, C/I) consists in the ratio between useful and disturbing signal strength (C/I).

15. An arrangement according to claim 9, wherein the channel quality parameter (I, BER, C/I) consists in the interference (I).

16. An arrangement according to claim 9, wherein the channel quality parameter (I, BER, C/I) consists in the bit error rate (BER).

* * * * *